United States Patent
Brown et al.

(10) Patent No.: US 12,386,032 B2
(45) Date of Patent: Aug. 12, 2025

(54) METHODS AND SYSTEMS FOR USING INTERFERENCE TO DETECT SENSOR IMPAIRMENT

(71) Applicant: Waymo LLC, Mountain View, CA (US)

(72) Inventors: Adam Brown, Mountain View, CA (US); Gary Clayton, Torrance, CA (US)

(73) Assignee: Waymo LLC, Mountain View, CA (US)

( * ) Notice: Subject to any disclaimer, the term of this patent is extended or adjusted under 35 U.S.C. 154(b) by 352 days.

(21) Appl. No.: 17/823,327

(22) Filed: Aug. 30, 2022

(65) Prior Publication Data

US 2024/0069157 A1    Feb. 29, 2024

(51) Int. Cl.
*G01S 7/40*      (2006.01)
*G01S 13/931*    (2020.01)
*H04W 4/02*      (2018.01)
*B60W 60/00*     (2020.01)

(52) U.S. Cl.
CPC .............. *G01S 7/40* (2013.01); *G01S 7/4039* (2021.05); *G01S 13/931* (2013.01); *H04W 4/023* (2013.01); *B60W 60/001* (2020.02); *B60W 2420/408* (2024.01)

(58) Field of Classification Search
None
See application file for complete search history.

(56) References Cited

U.S. PATENT DOCUMENTS

| | | |
|---|---|---|
| 7,271,880 B2 | 9/2007 | Samukawa |
| 7,451,035 B2 | 11/2008 | Nozawa |
| 7,486,222 B2 | 2/2009 | Matsuoka |
| 9,958,534 B2 | 5/2018 | Chabaud |
| 10,884,120 B2 | 1/2021 | Yu |
| 2021/0063546 A1 | 3/2021 | Slobodyanyuk |

(Continued)

FOREIGN PATENT DOCUMENTS

| | | | |
|---|---|---|---|
| DE | 102016221440 A1 | | 5/2018 |
| EP | 3825727 | * | 5/2021 |

(Continued)

OTHER PUBLICATIONS

Ryde et al., "Performance of Laser and Radar Ranging Devices in Adverse Environmental Conditions" (2009).

*Primary Examiner* — Hongye Liang
(74) *Attorney, Agent, or Firm* — McDonnell Boehnen Hulbert & Berghoff LLP

(57) ABSTRACT

Example embodiments relate to methods and systems for using interference to detect sensor impairment. Radar or another type of sensor on a vehicle may receive radio-frequency (RF) signals propagating in the environment. These RF signals may originate from an external source and a computing device can be used to determine a distance and an angle to the source in order to identify a power level threshold that represents an expected power associated with the RF signals. The computing device may then perform a comparison between a power level of the RF signals and a power level threshold. Based on the comparison, the computing device may decrease a confidence assigned to the radar coupled to the vehicle and control the vehicle based on the decreased confidence assigned to the radar.

20 Claims, 10 Drawing Sheets

(56) References Cited

U.S. PATENT DOCUMENTS

| | | |
|---|---|---|
| 2021/0190899 A1 | 6/2021 | Bolduc |
| 2022/0021868 A1* | 1/2022 | Hunt |
| 2022/0120845 A1* | 4/2022 | Gulati .................... H04W 4/40 |
| 2022/0207887 A1 | 6/2022 | Miyazawa |
| 2024/0149923 A1* | 5/2024 | Fang ..................... G06V 20/56 |

FOREIGN PATENT DOCUMENTS

| | | |
|---|---|---|
| EP | 3825727 A1 | 5/2021 |
| JP | 2009085920 A | 4/2009 |
| JP | 4321487 B2 | 8/2009 |
| JP | 2009250640 A | 10/2009 |
| JP | 2010091386 A | 4/2010 |
| KR | 1786039 B1 | 10/2017 |
| WO | 2022019162 A1 | 1/2022 |
| WO | 2022055873 A1 | 3/2022 |
| WO | 2022132608 A1 | 6/2022 |

\* cited by examiner

METHODS AND SYSTEMS FOR USING INTERFERENCE TO DETECT SENSOR IMPAIRMENT

BACKGROUND

Advancements in computing, sensors, and other technologies have enabled some vehicles to navigate safely between locations autonomously, i.e., without requiring input from a human driver. By processing sensor measurements of the surrounding environment in real-time, an autonomous vehicle can transport passengers or objects (e.g., cargo) between locations while avoiding obstacles, obeying traffic requirements, anticipating movements of nearby agents, and performing other actions that are typically conducted by a driver. Shifting both decision-making and control of the vehicle over to vehicle systems can allow passengers to devote their attention to tasks other than driving.

SUMMARY

Example embodiments relate to techniques for using interference to detect impairment of radars and other types of vehicle sensors. Sensor data from a vehicle sensor can be impacted by interference that arises when other nearby emitters are also transmitting signals in the direction of the vehicle. Disclosed techniques involve using one or multiple expected properties within detected interference that are derived based on the spatial relationship relative to the external emitter in order to determine if the receiving sensor is potentially experiencing fouling or some other form of impairment. Vehicle systems may further determine if the impairment is local to the vehicle sensor or caused by the emitting sensor based on additional sensor data and/or wireless communication with the external emitter.

In one aspect, an example method is provided. The method involves receiving, at a computing device and from a radar coupled to a vehicle, radio-frequency (RF) signals propagating in an environment of the vehicle, determining a distance and an angle to a source of the RF signals, and performing a comparison between a power level of the RF signals and a power level threshold. The power level threshold depends on the distance and the angle to the source of the RF signals. The method further involves decreasing a confidence assigned to the radar coupled to the vehicle based on the comparison and controlling the vehicle based on the decreased confidence assigned to the radar.

In another aspect, an example system is provided. The system includes a vehicle radar system and a computing device coupled to a vehicle. The computing device is configured to receive, from a radar, radio-frequency (RF) signals propagating in an environment of the vehicle and determine a distance and an angle to a source of the RF signals. The computing device is further configured to perform a comparison between a power level of the RF signals and a power level threshold. The power level threshold depends on the distance and the angle to the source of the RF signals. The computing device is further configured to decrease a confidence assigned to the radar coupled to the vehicle based on the comparison and control the vehicle based on the decreased confidence assigned to the radar.

In yet another example, an example non-transitory computer-readable medium is provided. The non-transitory computer-readable medium is configured to store instructions, that when executed by a computing system comprising one or more processors, causes the computing system to perform operations. The operations involve receiving, from a radar coupled to a vehicle, radio-frequency (RF) signals propagating in an environment of the vehicle, determining a distance and an angle to a source of the RF signals, and performing a comparison between a power level of the RF signals and a power level threshold. The power level threshold depends on the distance and the angle to the source of the RF signals. The operations further involve, based on the comparison, decreasing a confidence assigned to the radar coupled to the vehicle and controlling the vehicle based on the decreased confidence assigned to the radar.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
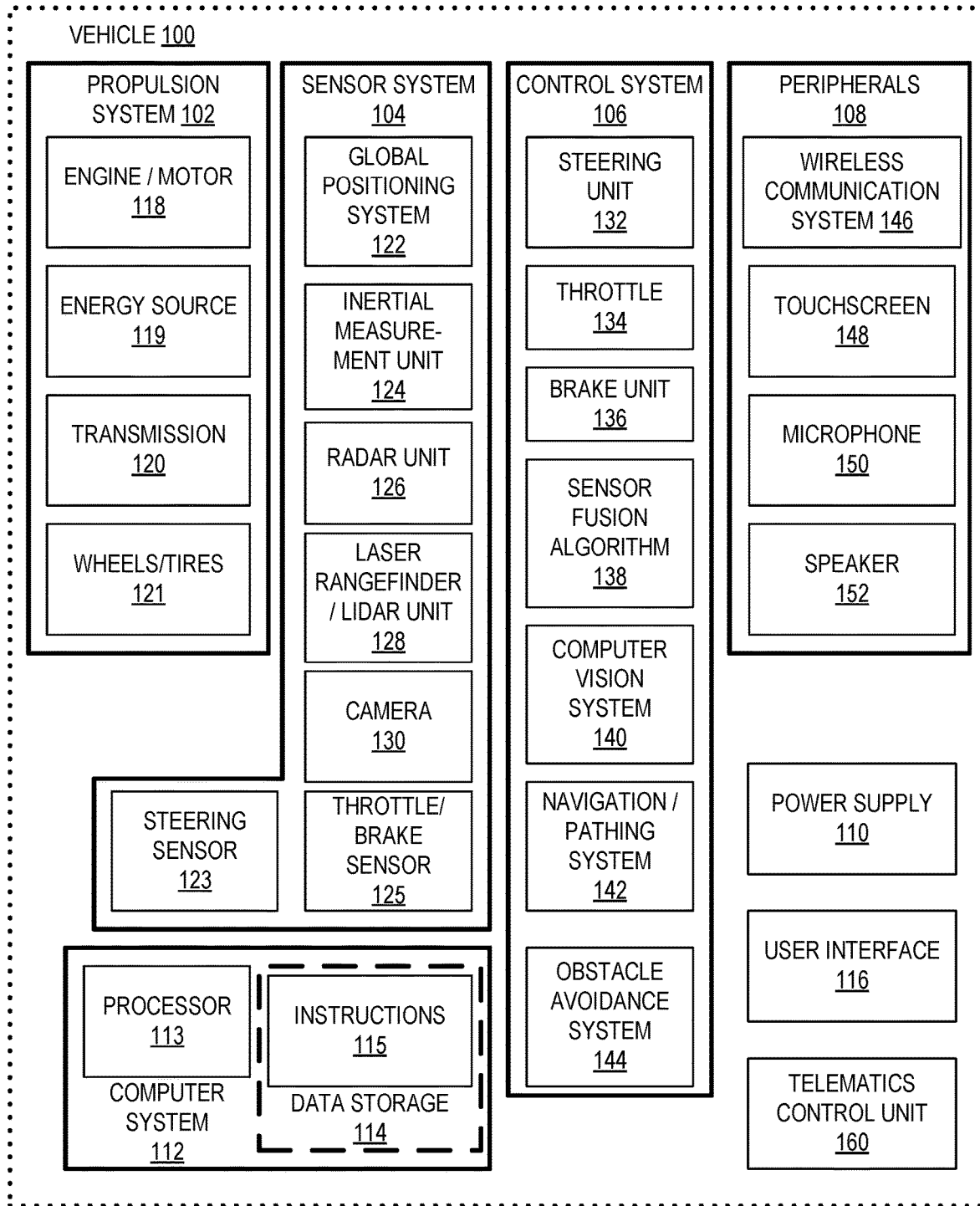
FIG. 1 is a functional block diagram illustrating a vehicle, according to one or more example embodiments.
Figure 2A:
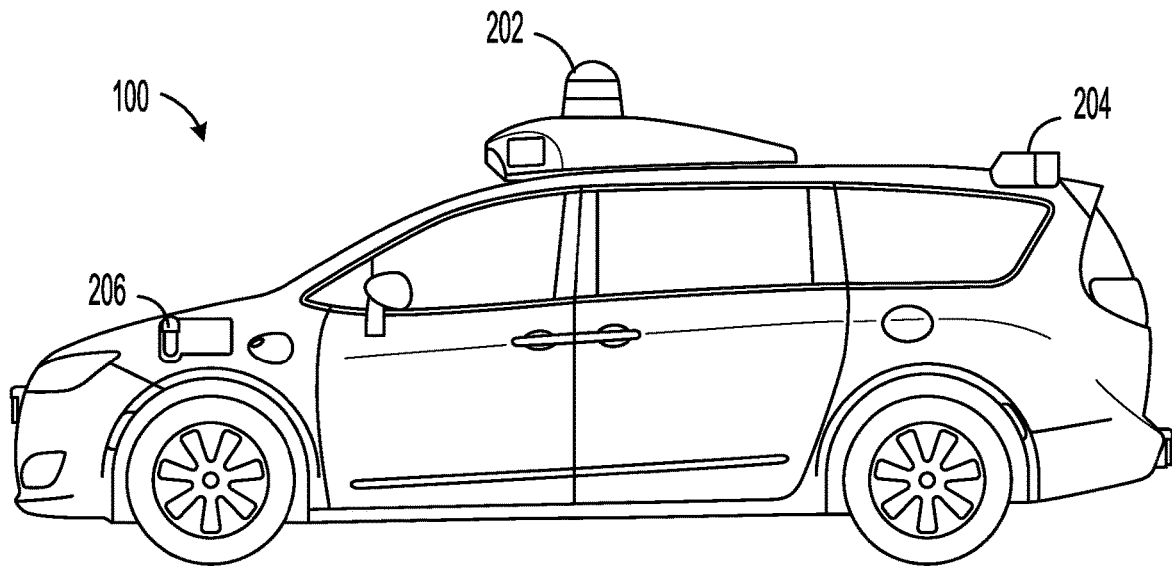
FIG. 2A illustrates a side view of a vehicle, according to one or more example embodiments.
Figure 2B:
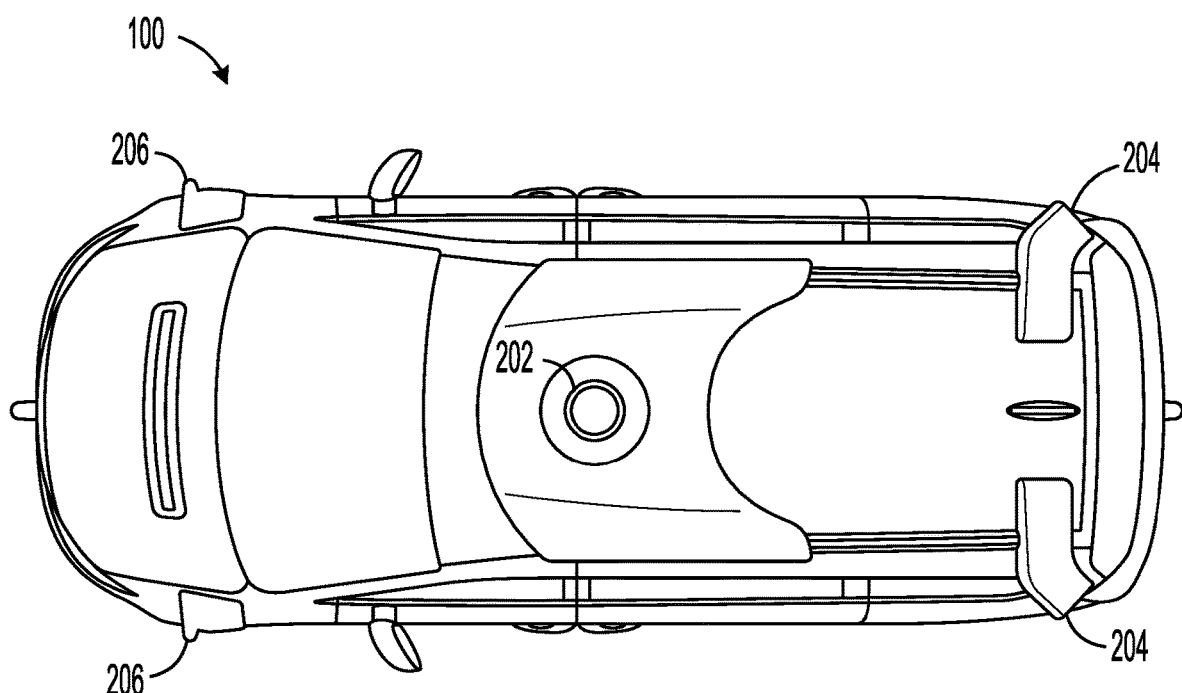
FIG. 2B illustrates a top view of a vehicle, according to one or more example embodiments.
Figure 2C:
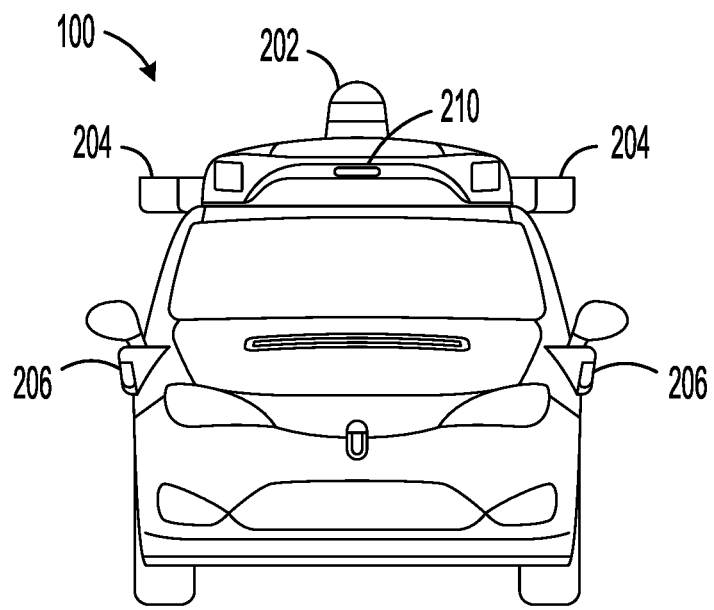
FIG. 2C illustrates a front view of a vehicle, according to one or more example embodiments.
Figure 2D:
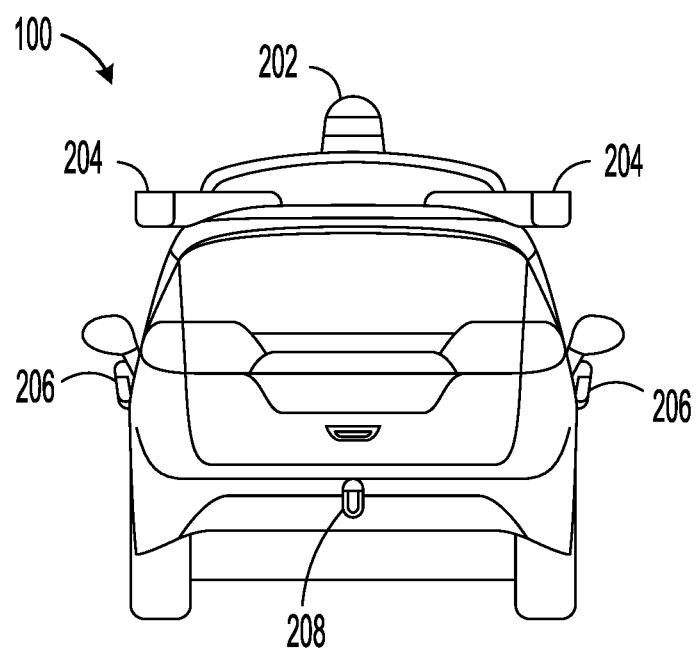
FIG. 2D illustrates a back view of a vehicle, according to one or more example embodiments.
Figure 2E:
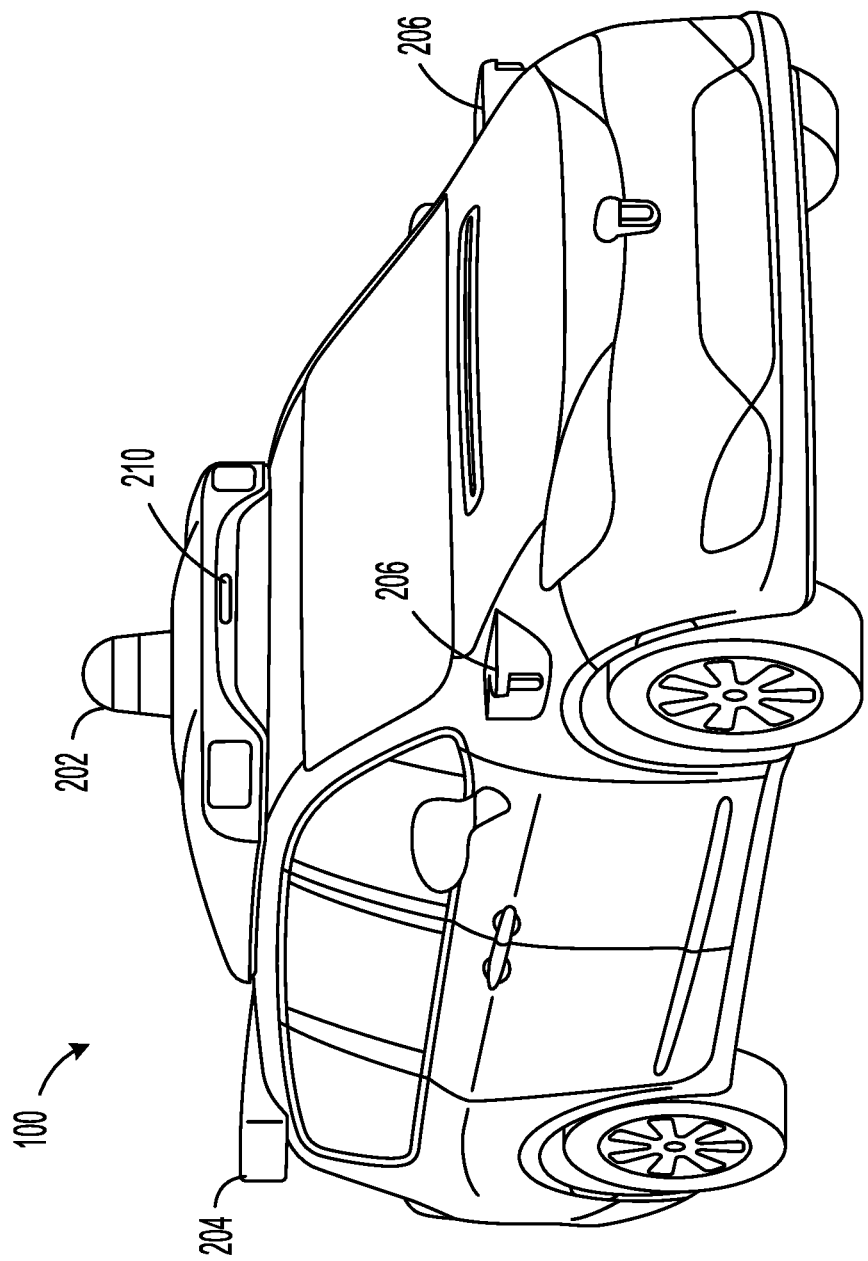
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Sensor measurements from vehicle sensors can allow vehicle systems to perform various operations for autonomous or semi-autonomous navigation. For instance, vehicle systems can use sensor data to detect and avoid obstacles, to measure road conditions and locate road boundaries, to locate and anticipate movements of nearby agents (e.g., other vehicles, pedestrians), to determine changes in traffic signals and signs, and to estimate weather conditions. In general, sensor data enables vehicle systems to gain an understanding of the surrounding environment in order to determine and perform a control strategy for autonomous navigation to a destination.

The types, quantity, and arrangement of vehicle sensors used by an autonomous or semi-autonomous vehicle can vary within example embodiments. Some vehicles include a vehicle radar system, which is configured to detect nearby objects by transmitting electromagnetic signals (radar signals) and analyzing the backscattered signals that reflect off from the objects and other surfaces in the environment. The vehicle radar system can detect objects by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit coupled to the vehicle. As such, received reflections can be used by a radar processing system (e.g., a computing device) to generate two dimensional (2D) and/or three dimensional (3D) measurements that represent measurements of the environment, such as the positions, orientations, and movements of nearby objects and other surfaces occupying the environment near the radar system. In some cases, radar is used to generate range data, Doppler data, azimuth data, and/or elevation data for objects and other surfaces in the surrounding environment.

When multiple radars or other types of electromagnetic emitting sensors (e.g., lidar) are operating in the same general location, interference can arise between the different sensors. In particular, interference may be detected by a processing system within the sensor data received from a sensor when signals emitted by an external emitter are also received by the sensor. These external signals can be received in addition to the desired reflections of signals originally transmitted by the vehicle sensor and can produce undesired artifacts that can impact processing and subsequent use of the sensor data.

By way of an example, interference can occur when multiple radars positioned in relatively close proximity are operating on the same frequency or frequencies (or similar frequencies). This can cause negative effects that impact radar reflection processing for both of the radar systems and can even temporarily limit the use of the radar data by each radar system until the interference decreases. In practice, a radar system may fail to distinguish between reflections of its own transmitted signals and other signals produced by other emitters in the surrounding environment when the signals share similarities, such as operating at similar frequencies and waveforms. The resulting interference is noise that can disrupt and temporarily decrease the processor's ability to accurately measure aspects of the surrounding environment based on the radar data. Lidar and other types of vehicle sensors can experience similar interference when operating nearby sensors that emit signals with similar properties.

With the number of vehicles incorporating sensors for navigation continuing to increase overall, vehicle sensor systems are more likely to encounter interference during navigation within various environments, especially within city limits and other RF-dense areas that typically have more vehicles navigating in multiple directions within close proximity.

Example embodiments presented herein advantageously use signal interference to detect sensor impairments for sensors operating onboard a vehicle. In practice, the signal interference caused by signals from external emitters can be evaluated by vehicle systems to detect when the receiving radar or another type of sensor is potentially impaired by fouling or another issue. By performing disclosed techniques, real-time knowledge of sensor performance impairments can be generated and used to estimate relative and/or absolute sensor performance degradation. Vehicle systems can then update sensor-specific models and/or other downstream models (e.g., perception or behavior) based on the estimations, thereby improving vehicle performance during navigation.

Disclosed techniques can involve evaluating interference based on the spatial relationship between a receiving sensor and the external emitter of the source signals that caused the interference. The spatial relationship and an interference model can indicate when the receiving sensor is potentially experiencing impairment. In some embodiments, vehicle systems may use additional sensor data and/or wireless communication with one or multiple external emitters to further analyze the potential impairments detected for onboard vehicle sensors. For instance, additional sensor data from a potentially impaired sensor, sensor data from other sensors, and/or wireless communication with the source of interfering signals can enable vehicle systems to increase or decrease confidence assigned to the onboard vehicle sensor that is potentially impaired. In some cases, vehicle systems may determine that the sensor initially appeared impaired due to issues associated with the external emitter and/or atmospheric loss and can then continue to use sensor data from the sensor (e.g., increase a confidence assigned to the sensor).

In some embodiments, disclosed techniques are used to estimate the level of impairment experienced by a sensor, which can indicate the subsequent confidence that can be assigned to sensor data from the sensor. In some cases, vehicle systems may determine that a sensor requires some form of maintenance, which may trigger an alert notification and the avoidance of subsequent use of the sensor until the maintenance is performed. In some instances, a vehicle may even temporarily refrain from navigation until a particular sensor impairment is resolved. In other examples, vehicle systems may initiate one or multiple cleaning techniques to try to resolve the impairment experienced by a sensor. As such, vehicle systems can iteratively perform disclosed techniques to test individual sensors positioned on the vehicle.

By way of an example, a vehicle computing device may receive RF signals propagating in a vehicle's environment from a radar located on the vehicle and then determine the RF signals have properties (e.g., frequency and waveform) that indicate the RF signals originated from another nearby emitter, such as from the radar system of a nearby vehicle. In practice, the sensor data provided by the radar may appear to have interference caused by the external RF signals. As such, based on the spatial relationship between the receiving radar and the source of these RF signals, the computing device may determine expected properties for the interference that includes the RF signals, which then can be compared to one or multiple properties measured from the RF signals. For instance, the computing device may use an interference model that articulates expected properties for the interference based on the location and angle of the emitter relative to the receiving sensor. As such, when the comparison yields an identifiable difference between measured properties and expected properties, this may signal that the sensor located onboard the vehicle that received the RF signals is potentially experiencing fouling or another issue that impaired performance (i.e., the reception of the external signals). For example, when the power level of the interference caused by the RF signals is below a threshold power level determined based on the distance and the angle of the emitter, the decreased power may be due to fouling on the radome of the radar, which may require cleaning or replacement to increase performance of the radar.

Because atmospheric loss and/or operations by the external emitter may have contributed to the difference detected during the comparison, the computing device may use further sensor data from the radar and/or other sensors to further analyze the potential impairment in some cases. Subsequent performance by the radar and/or sensor data from other sensors can enable the computing device to further evaluate if the radar is impaired. In some instances, the radar may produce quality radar data when the interference diminishes, which may indicate that the initially detected impairment is not attributable to the performance of the radar or the impairment was temporary. In some examples, the computing device may also communicate with the external emitter to determine if the apparent impairment temporarily associated with the radar may have been caused by the external emitter and/or atmospheric loss. The external emitter may provide information that indicates the external emitter is experiencing fouling or some other issue that resulted in the difference identified during the comparison. In addition, vehicle systems can also test the potentially impaired sensor based on subsequent interference that occurs with another external emitter to validate the performance of the sensor. When the sensor appears impaired again, this may signal that the sensor is actually impaired and requires cleaning and/or some form of maintenance or calibration.

Disclosed techniques can involve anticipating interference properties based on the spatial relationship between the sensor that received the signals emitted by an external source and the external source. In particular, the spatial relationship allows a computing device to evaluate the interference and may involve using the received external signals, other sensor data, and/or wireless communication with the external emitter to estimate the distance and the angle to the emitter. The computing device may then use the distance and the angle to determine properties expected for the interference, which may involve using an interference model that represents expected properties for different spatial relationships between an onboard receiving sensor and an external emitter. For instance, the computing device may determine a power level threshold or a power range that should be measured within the received RF interference based on the distance and angle to the source. The interference model can specify the power level threshold or power range. As such, the expected power level can be higher or lower pending on the angle and the distance between the emitter and the receiving radar. In practice, the expected power level can be lower when the distance between the emitter and the sensor is farther. The computing device can also analyze other properties of the RF interference by comparing them to expected values for the properties.

Evaluation of the properties of detected interference can indicate if the receiving radar is potentially experiencing some form of impairment, such as fouling on the radome. In practice, when the measured power of the received signals is lower than the expected power level, this may indicate that fouling is impairing the radar that received the RF signals. Fouling can occur when dirt, precipitation, or other physical material covers a sensor's covering (e.g., a radar's radome) and partially impacts the ability for the sensor to receive signals. In some cases, physical damage can also hinder the sensor's ability to receive signals. The lower measured power relative to the expected power could also indicate that the emitter of the RF interference is operating at an unexpected power transmission level and/or is experiencing some form of sensor impairment. In some cases, atmospheric loss can also contribute to the detected difference between expected power level (e.g., a power threshold level) and the measured power. As such, additional sensor data and/or wireless communication with the external emitter may be used to further analyze the condition of the receiving sensor.

In some cases, when the measured power of received interference is lower than the expected power, this can indicate that the receiving sensor, the emitting sensor, and/or both sensors are experiencing some impairment. Atmospheric losses can also influence the comparison in some situations. As such, vehicle systems can perform additional operations to determine if the receiving sensor positioned locally on the vehicle is the cause of the lower measured power. In some embodiments, vehicle systems may communicate with the source of the interference signals. For instance, vehicle systems may communicate with the nearby vehicle to determine information that can be used to determine if the radar that received the RF interference signals is experiencing impairment due to fouling. The vehicles may both operate within a fleet and can share encrypted data within the fleet when performing disclosed techniques.

Wireless communication between vehicles can help each vehicle determine if any sensors are experiencing fouling that may hinder performance. For instance, a pair of vehicles may communicate location information to enable each vehicle to discern if radars have fouling present that may impact performance. As an example, a computing device onboard a vehicle may identify if the power radiated by another fleet vehicle is within its expected range based on the distance and angle between the receiving sensor and the sensor that emitted the RF signals. When low power is detected, it can indicate fouling is present on one or both of the radars. Additional sensor data can also be used to determine if the vehicle's sensor is impaired. Through additional measurements obtained via the sensor and/or other sensors, the severity of fouling on each individual sensor can be determined, along with sensitivity impacts. The vehicle may then make adjustments based on the severity of the fouling.

In some examples, vehicle systems may use independent calibration devices to perform disclosed techniques. For instance, a vehicle can position itself relative to calibration device. The calibration device may emit signals toward the sensors positioned on the vehicle. Vehicle systems can use the fixed location of the calibration device and transmission parameters provided by the calibration device to detect if any of the receiving sensors located onboard the vehicle are performing less than optimal.

In some embodiments, a vehicle radar system may use multiple receive apertures (antennas) to receive electromagnetic waves radiating in the vehicle's environment, such as using a linear array of antennas on one or more radar units coupled to the vehicle to receive radiating electromagnetic waves in the area that originated from one or more external emitters. By using multiple receive apertures, a processing unit may analyze the received electromagnetic waves to determine a line of bearing to the emitter. For example, the processing unit may use a Frequency Difference of Arrival (FDOA) process and/or a Time Difference of Arrival (TDOA) process to determine a location of the external emitter (e.g., another vehicle) that transmitted the electromagnetic energy relative to the vehicle's position, which can then be factored as part of the navigation strategy.

The following detailed description may be used with one or more radar units having one or multiple antenna arrays. The one or multiple antenna arrays may take the form of a single-input single-output (SISO), single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

An antenna array may involve a set of multiple connected antennas that can work together as a single antenna to transmit or receive signals. By combining multiple radiating elements (i.e., antennas), an antenna array may enhance the performance of the radar unit used in some embodiments. In particular, a higher gain and narrower beam may be achieved when a radar unit is equipped with one or more antenna arrays. Antennas on a radar unit may be arranged in one or more linear antenna arrays (i.e., antennas within an array are aligned in a straight line, arranged in planar arrays (i.e., antennas arranged in multiple, parallel lines on a single plane), and/or multiple planes resulting in a three dimensional array. A radar unit may also include multiple types of arrays (e.g., a linear array on one portion and a planar array on another portion).

In some examples, a radar unit may use an antenna arranged into antenna channels. Each channel may have its own amplifier and/or analogue-to-digital converter (ADC) and can be operated independently from the other antenna channels. The antennas in each channel may also be referred to as radiating apertures and can be aligned in a specific arrangement, such as a linear array. For instance, a radar unit may include 20 or more antenna channels with each channel consisting of four to 10 antennas arranged in a linear array. The radiating apertures in the channel can then be power combined passively and connected to either an amplifier or ADC.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
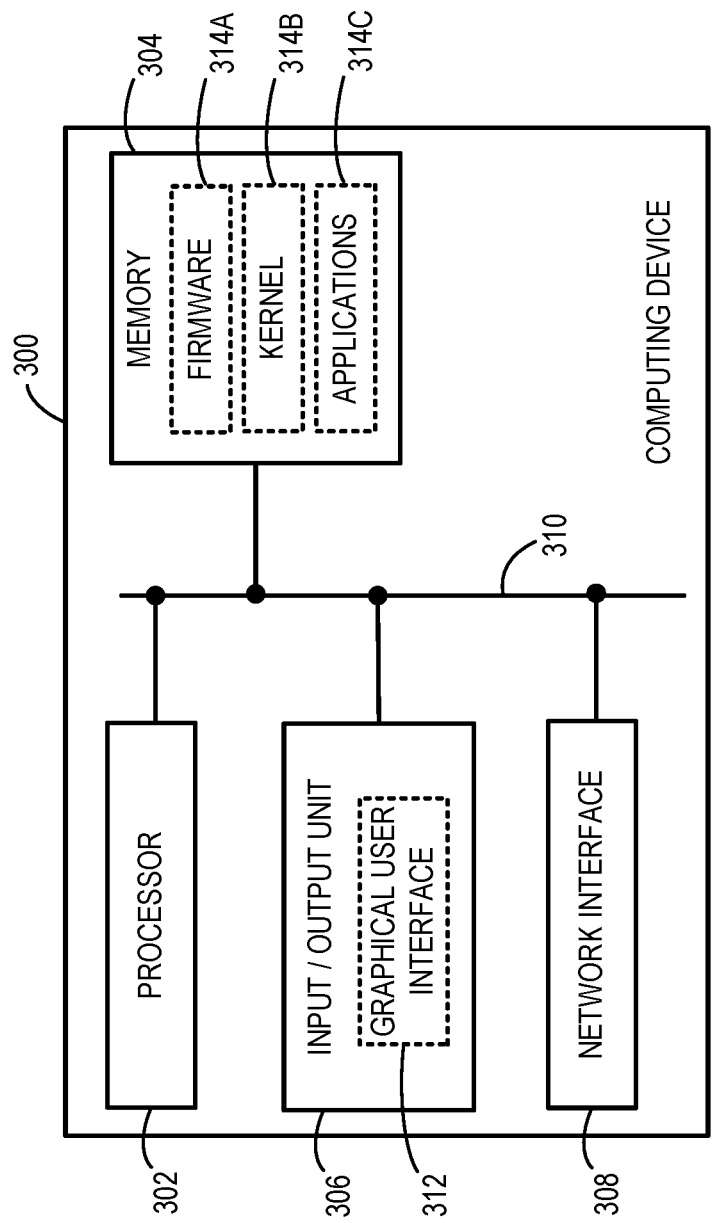
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may have one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
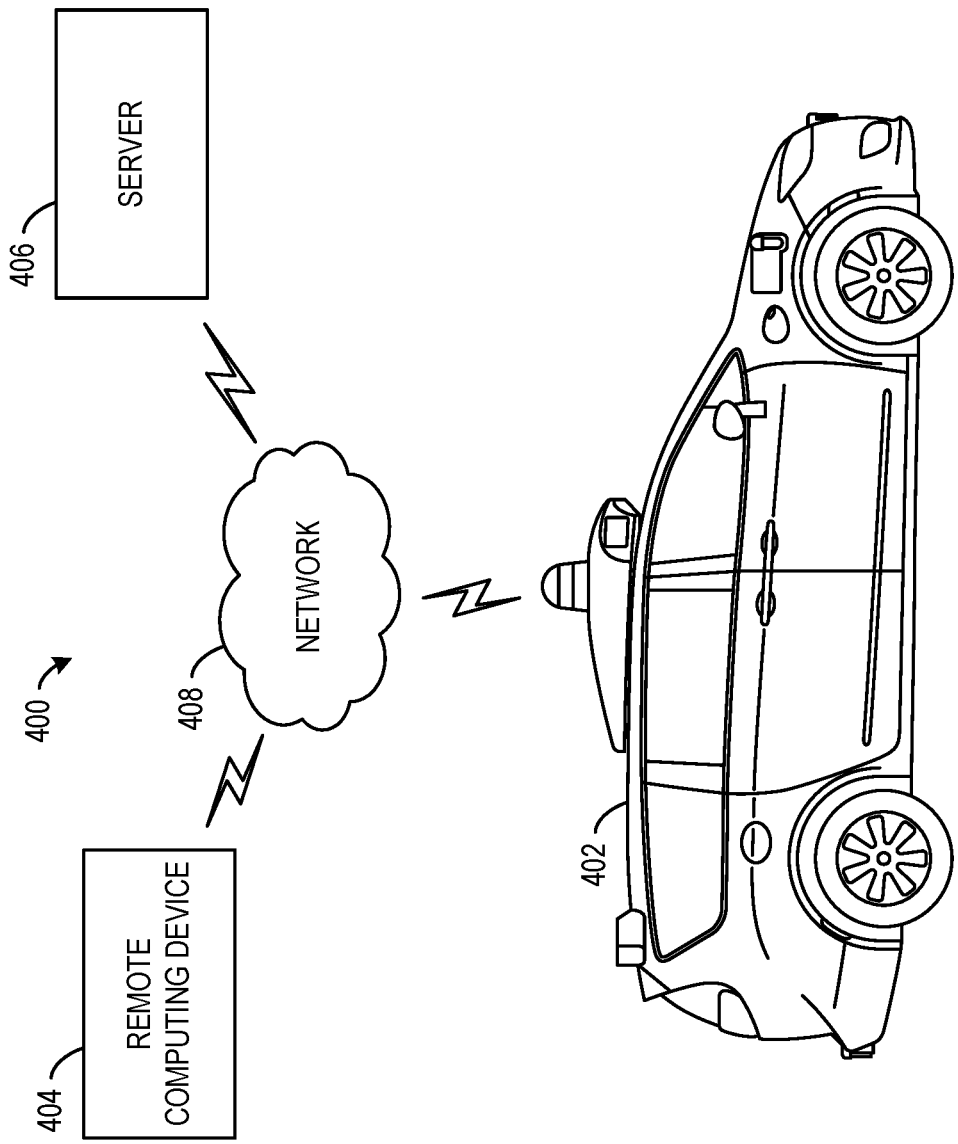
FIG. 4 depicts a system that enables wireless communication between a vehicle and computing devices, according to one or more example embodiments

FIG. 4 depicts system 400 for wireless communication between computing devices and a vehicle, according to one or more example embodiments. In the example embodiment, system 400 includes vehicle 402, remote computing device 404, and server 406 communicating wirelessly via network 408. System 400 may include other components not shown within other embodiments, such as additional vehicles, computing devices, servers, firewalls, and multiple networks, among others.

System 400 may enable performance of disclosed techniques described herein. For instance, vehicle 402 may be configured to autonomously (or semi-autonomously) transport passengers or objects (e.g., cargo) between locations and can have the form of any one or more of the vehicles discussed above, including passenger vehicles, cargo shipping vehicles (e.g., trucks), farming and manufacturing vehicles, and dual-purpose vehicles, among others. When operating in an autonomous mode, vehicle 402 may safely navigate to pick up and drop off passengers (or cargo) between different locations by using sensor measurements to detect and understand the surrounding environment. In some embodiments, vehicle 402 can operate as part of a fleet of vehicles, which may be managed by a central system (e.g., remote computing device 404 and/or other computing devices not shown in FIG. 4).

Remote computing device 404 may represent any type of computing device or multiple devices configured to perform operations, including but not limited to those described herein. The position of remote computing device 404 relative to vehicle 402 can vary within examples. For instance, remote computing device 404 may have a remote position from vehicle 402, such as operating inside a building. In other cases, remote computing device 404 can be a passenger device located within vehicle 402, such as a smartphone or a specialized computing device. In some implementations, operations described herein that are performed by remote computing device 404 may be additionally or alternatively performed by vehicle 402 (i.e., by any system(s) or subsystem(s) of vehicle 100). In addition, operations described herein can be performed by any of the components communicating via network 408. For instance, remote computing device 404 may determine operations for vehicle 402 to execute using information (e.g., sensor data) provided by vehicle 402, server 406, and/or other sources. In some embodiments, remote computing device 404 may use a GUI to convey information and display selectable options for review by a remote operator.

Server 406 may wirelessly communicate information with remote computing device 404 and vehicle 402 via network 408 (or perhaps directly with remote computing device 404 and/or vehicle 402). Server 406 may represent any computing device configured to receive, store, determine, and/or send information relating to vehicle 402 and the remote assistance thereof. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network. In some embodiments, vehicle 402 may communicate with remote computing device 404 and/or server 406 via network 408 to receive and/or provide information related to sensor fouling techniques described herein. For instance, server 406 or remote computing device 404 may communicate an interference model to vehicle 402 for subsequent use during performance of disclosed techniques.

Figure 5:
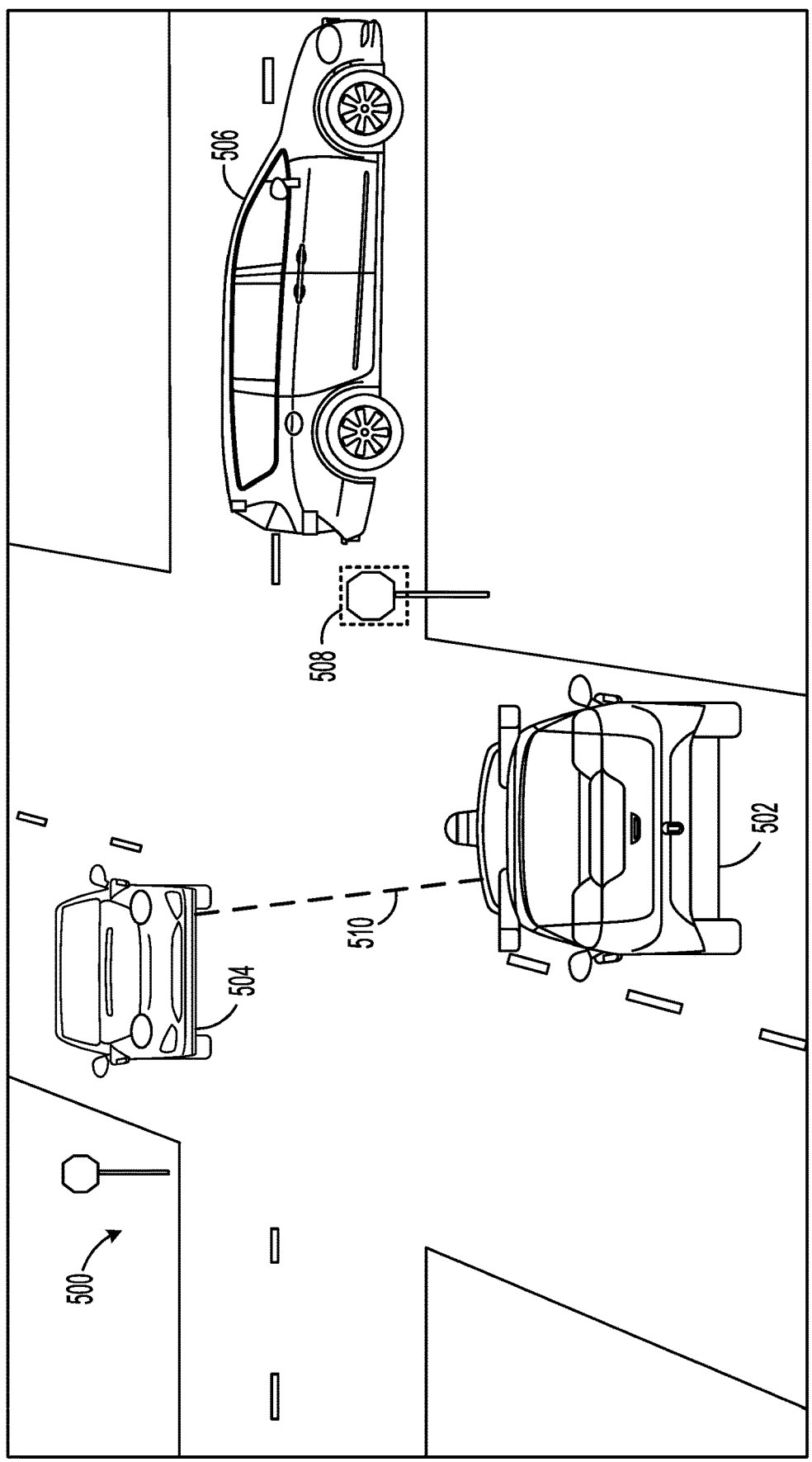
FIG. 5 depicts a scenario for using interference to detect sensor impairment, according to one or more example embodiments.

FIG. 5 depicts scenario 500 showing vehicles using interference to detect sensor impairment. In the example embodiment, scenario 500 represents an example situation involving vehicle 502, vehicle 504, and vehicle 506 navigating relative to an intersection and in the same general environment. As shown in scenario 500, vehicle 502 is slowing down to stop at the intersection in accordance with stop sign 508, while vehicle 504 is stopped on the other side of the intersection relative to vehicle 502 and vehicle 506 is also shown located nearby vehicle 502. With vehicles 502-506 operating near each other, signal interference can arise between the sensors (e.g., radar, lidar) operating on different vehicles. By evaluating measured signal interference relative to expected properties, one or multiple vehicles 502-506 may perform sensor fouling detection techniques disclosed herein.

To further illustrate performance of disclosed techniques from the perspective of vehicle 502, one or multiple sensors on vehicle 502 may receive electromagnetic energy emitted by an external source. For instance, a forward-facing radar positioned on vehicle 502 may capture radar measurements that are impacted by interference caused by RF signals emitted by one or multiple forward-facing radars positioned on vehicle 504. An onboard computing system of vehicle 502 may perform disclosed techniques to diagnose the performance of the forward-facing radar experiencing the interference, which may involve analyzing the interference detected within radar returns relative to expected properties for interference. For instance, the computing device may compare a power level of the measured RF signals with a power level threshold that depends on the distance and the angle between vehicle 502 and vehicle 504 as represented by spatial relationship 510. The power level threshold can be determined based on an interference model that represents power levels based on spatial relationship 510 between the receiving sensor and the source of the interference. The comparison may indicate if the forward-facing radar positioned on vehicle 502 is potentially impaired by fouling or another issue.

The computing device may further use additional sensor data from one or multiple sensors on vehicle 502 and/or wireless communication with vehicle 504 to determine if the impairment is local to the forward-facing radar on vehicle 502 and/or the emitter on vehicle 504 is the cause. As shown, in order to evaluate the RF interference, vehicle 502 may initially identify the source of the RF signals and then determine spatial relationship 510 relative to the source. For instance, vehicle 502 may determine that the source of the RF signals is vehicle 504 based on the reception angle of the RF signals and the position and orientation of the radar that received the RF signals.

Vehicle 502 may also use wireless communication to identify the source (e.g., vehicle 504). Determining the spatial positioning relative to a source of a signal (e.g., a sensor) can differ within examples. In some examples, the position and orientation of the receiving sensor can indicate where incoming signals may have originated. Additional sensor data can further be used to determine the spatial positioning. In addition, the onboard computing device may communicate with vehicle 504 to obtain transmission information. For instance, vehicle 504 and vehicle 502 can share transmission parameters and location information to enable performance of disclosed techniques by the other vehicle.

Determination of spatial relationship 510 can allow the computing device onboard vehicle 502 to identify expected properties that can be used to evaluate the interference and determine if the receiving radar is experiencing some form of impairment. For instance, the computing device may identify a power level threshold that should be measured within the received RF interference based on the distance and angle to the source as represented by spatial relationship 510. The expected power level can be higher or lower pending on the angle and the distance between the emitter and the receiving radar. For instance, the expected power level can be lower when the distance between the emitter and the sensor is farther. The computing device can also analyze other properties of the RF interference by comparing them to expected values for the properties.

Evaluation of the properties of the interference can indicate if the receiving radar is potentially experiencing some form of impairment, such as fouling on the radome. In particular, when the measured power of the received signals is lower than the expected power level, this may indicate that fouling is impairing the radar that received the RF signals. Fouling occurs when dirt, precipitation, or other physical material covers a sensor's covering (e.g., a radar's radome) and partially impacts the ability for the sensor to receive signals. In some cases, physical damage can also hinder the sensor's ability to receive signals. The lower measured power relative to the expected power could also indicate that the emitter of the RF interference is operating at an unexpected power transmission level and/or is experiencing some form of sensor impairment. Vehicle 502 may decrease confidence associated with the receiving sensor based on the results of disclosed techniques. The decreased confidence can be temporary in some cases, such as when additional sensor data shows that the impairment is no longer impacting the particular sensor. In some examples, vehicle 502 may further evaluate the performance of the potentially impaired radar (or other type of sensor) based on interference with vehicle 506.

In some embodiments, a central system may perform disclosed techniques based on information received from multiple vehicles. For instance, the central system may receive information from multiple vehicles 502-506 that indicates orientation, position, and operation parameters for sensors and use the information to perform disclosed techniques. The central system can perform the disclosed techniques and relay results to the different vehicles 502-506 and/or share the information for onboard vehicle systems to perform disclosed techniques.

Figure 6:
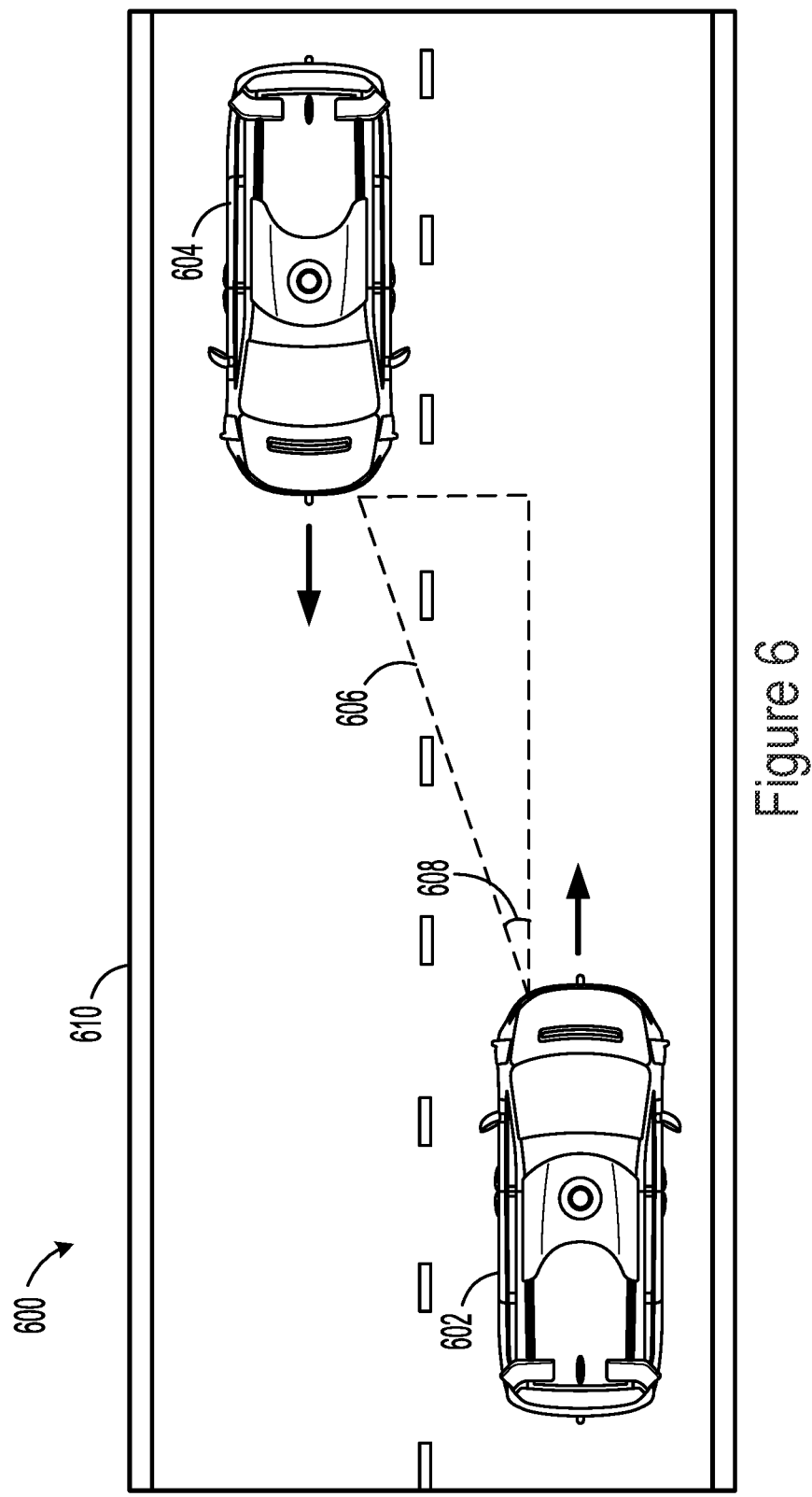
FIG. 6 depicts another scenario showing a vehicle using interference caused by sensors on another vehicle in order to analyze potential onboard sensor impairment, according to one or more example embodiments.

FIG. 6 depicts another scenario 600 showing vehicle 602 using interference caused by sensors on vehicle 604 in order to analyze potential onboard sensor impairment. As shown in the example embodiment, vehicle 602 and vehicle 604 are traveling in opposite directions on road 610. The spatial relationship between vehicles 602-604 is shown for illustration purposes and can differ in real-world applications. In particular, the distance between vehicles 602-604 can be greater while vehicles 602-604 can still perform disclosed techniques to detect potential sensor impairments. In addition, vehicle 602 and vehicle 604 may operate as part of the same fleet in some examples. In such cases, vehicles 602-604 may share information with each other and/or a central management system.

In scenario 600, vehicle 602 may detect interference within sensor returns from one or multiple types of sensors. For instance, radar and/or lidar positioned on vehicle 602 may experience interference within returns due to sensor signals emitted by sensors positioned on vehicle 604. A computing system on vehicle 602 may use the detected interference to analyze the operation condition of one or multiple sensors.

As an example, FIG. 6 shows vehicle 602 performing disclosed techniques based on a forward-facing radar positioned near a front bumper of vehicle 602. The forward-facing radar may receive RF signals that originated from a forward-facing radar positioned on vehicle 604. Based on the pattern of the returns produced by the radar on vehicle 602, the computing system may determine that interference is present and subsequently determine a spatial relationship with the source of the interference. In practice, vehicle 602 may anticipate interference based on the proximity of vehicle 604 and/or communication with vehicle 604. For instance, vehicle 602 and vehicle 604 may communicate wirelessly and share information (e.g., location and transmission data) to perform disclosed techniques.

In order to evaluate potential impairment at the radar, the computing system on vehicle 602 may estimate the spatial relationship relative to the emitting sensor positioned on vehicle 604. As shown, the computing system may determine distance 606 and angle 608 between the radar located onboard vehicle 602 and the emitting radar positioned on vehicle 604. The spatial relationship can be determined based on sensor data, communication between vehicles 602-604, and/or other factors (e.g., vehicle position and transmission information from a central system).

In some examples, the computing system on vehicle 602 may perform a comparison between a power level of the RF signals and a power level threshold that depends on the distance and the angle to the source of the RF signals (e.g., the radar positioned on vehicle 604). For instance, the computing system may use an interference model and/or communication with vehicle 604 to determine an expected power level (e.g., a power level threshold) for the radar returns impacted by the interference. When the actual power level within the radar returns differs, this may indicate that the receiving radar on vehicle 602 is potentially impaired. In some cases, the computing system on vehicle 602 may then decrease a confidence assigned to the radar coupled to the vehicle based on the comparison and subsequently control the vehicle based on the decreased confidence assigned to the radar. For instance, the computing system may rely on sensor measurements from other sensors until validating the potential impairment of the analyzed radar.

Vehicle 602 may further communicate with vehicle 604 in some examples. Further communication may enable vehicle 602 to determine if the onboard radar is impaired or if the emitting radar on vehicle 604 is potentially the source of the difference detected within the comparison. For instance, the communication between vehicles 602-604 may reveal that the emitting radar on vehicle 604 is experiencing fouling or some other impairment and/or atmospheric loss may have contributed to the difference detected bet ween the measured interference and expected interference by vehicle 602. In some examples, vehicle 602 may use additional sensor data from the radar and/or other sensors to further analyze the potential impairment of the forward-facing radar. In some cases, radar data from the forward-facing radar may show that the radar is operating properly without any impairment. In addition, vehicle 604 may also perform disclosed techniques in a manner similar to vehicle 602 in some examples.

Figure 7:
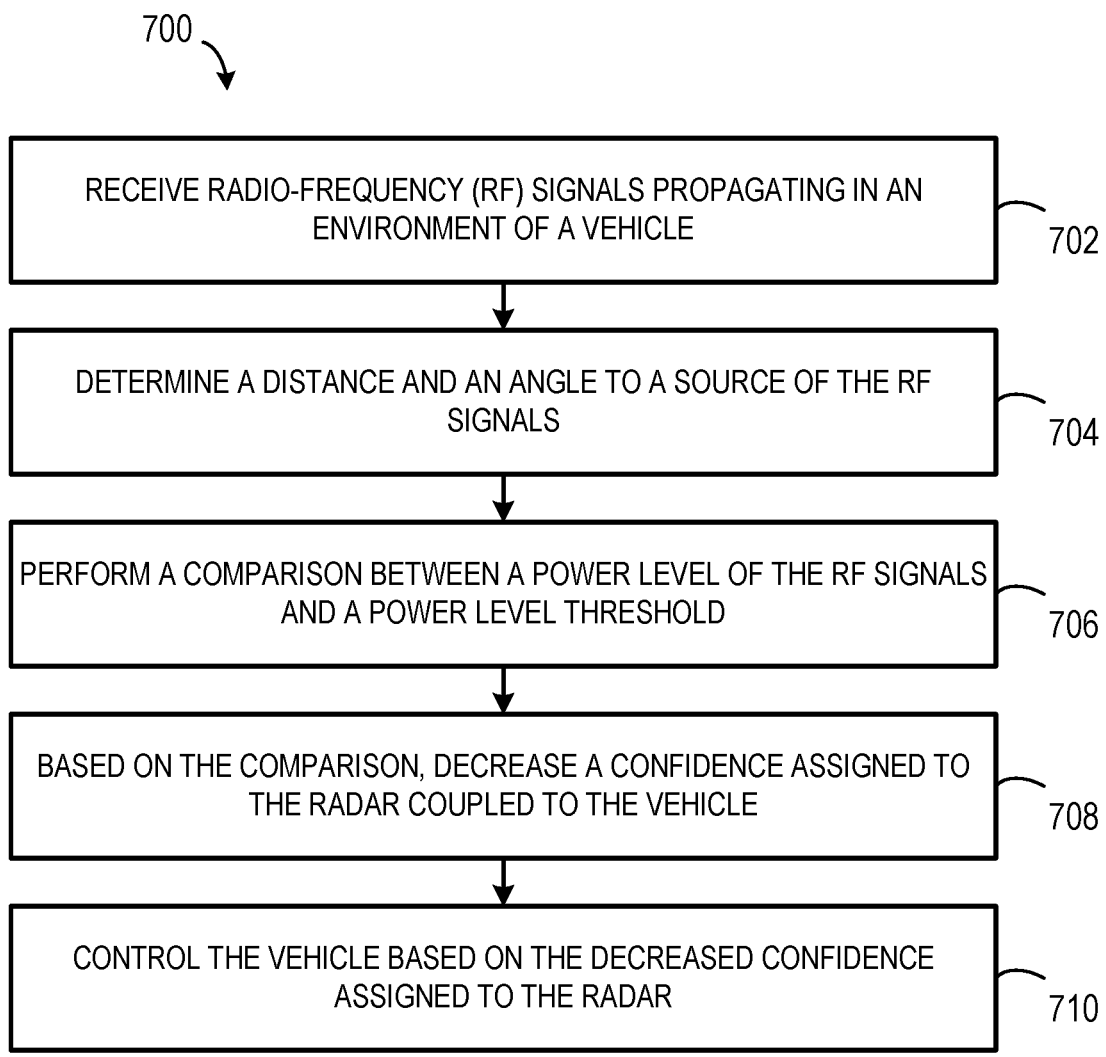
FIG. 7 is a flow chart of a method for using interference to detect sensor impairment, according to example embodiments.

FIG. 7 is a flowchart of example method 700 for operating a radar system, according to one or more embodiments. Method 700 may include one or more operations, functions, or actions, as depicted by one or more of blocks 702, 704, 706, 708, and 710, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

Block 702 of method 700 involves receiving radio-frequency (RF) signals propagating in an environment of the vehicle. For instance, a vehicle computing device or another type of computing system may receive the RF signals from one or multiple radars positioned on the vehicle during navigation. In other cases, the computing device can receive other types of sensor signals propagating in the environment.

Block 704 of method 700 involves determining a distance and an angle to a source of the RF signals. For instance, the computing device may determine the RF signals originating from a second vehicle positioned in the environment and estimate a distance and an angle to the second vehicle. In some cases, the computing device may estimate the distance and the angle to the second vehicle based on wireless communication with the second vehicle. In other cases, the computing device may estimate the distance and the angle to the second vehicle based on sensor data from one or more vehicle sensors.

In some examples, the computing device may identify one or more parameters of the RF that indicate the RF signals originate from an external emitter based on receiving the RF signals. For instance, the computing device may perform a comparison between first parameters corresponding to RF signals transmitted by the radar coupled to the vehicle and second parameters corresponding to the RF signals propagating in the environment. Based on the comparison between the first parameters and the second parameters, the computing device may identify at least one parameter in the second parameter that indicates the RF signals originate from the external emitter. Example parameters that can be used to distinguish the received RF signals from reflections of signals emitted by the radar include the polarization, the waveform, the timing, the Doppler dimension, and other aspects of the RF signals.

Block 706 of method 700 involves performing a comparison between a power level of the RF signals and a power level threshold. The power level threshold depends on the distance and the angle to the source of the RF signals.

In some examples, the computing device may identify, using an interference model, the power level threshold based on determining the distance and the angle to the source of the RF signals. The interference model can represent respective power level thresholds for multiple spatial relationships between the vehicle and the source of the RF signals. Each spatial relationship depends on a given distance and a given angle between the vehicle and the given source of the RF signals.

Block 708 of method 700 involves decreasing a confidence assigned to the radar coupled to the vehicle based on the comparison. For instance, the computing device may determine the power level of the RF signals is below the power level threshold based on the comparison. The computing device may decrease the confidence assigned to the radar based on determining if the power level of the RF signals is below the power level threshold. In some cases, the computing device may determine fouling is present on a radome of the radar.

In some examples, the computing device may trigger a cleaning process for the radar based on the comparison. For instance, the comparison may convey that the radome of the radar is likely experiencing fouling and perform a cleaning process on the radome to try to reduce the fouling. The computing device may then evaluate subsequent performance by the radar based on triggering the cleaning process for the radar. The computing device can then adjust the confidence assigned to the radar based on evaluating subsequent performance by the radar.

Block 710 of method 700 involves controlling the vehicle based on the decreased confidence assigned to the radar. The computing device or another computing system on the vehicle may control the vehicle based on sensor data from one or more vehicle sensors. For instance, the computing device may use other sensors.

In some examples, method 700 further involves communicating with the source of the RF signals and increasing the confidence assigned to the radar based on communicating with the source of the RF signals. In some examples, method 700 further involves receiving radar data from the radar coupled to the vehicle and increasing the confidence assigned to the radar based on the radar data. In some cases, the vehicle may initiate one or more cleaning techniques and reanalyze performance of the sensor after.

In some examples, the vehicle is a first vehicle and the source of the RF signals is a radar coupled to a second vehicle, and the second vehicle is configured to wirelessly communicate transmission parameters and location information to the first vehicle. As such, the computing device can be further configured to determine the distance and the angle to the second vehicle based on the location information. The computing device may also perform the comparison between the power level of the RF signals and the power level threshold, where the power level threshold is further based on the transmission parameters.

Figure 8:
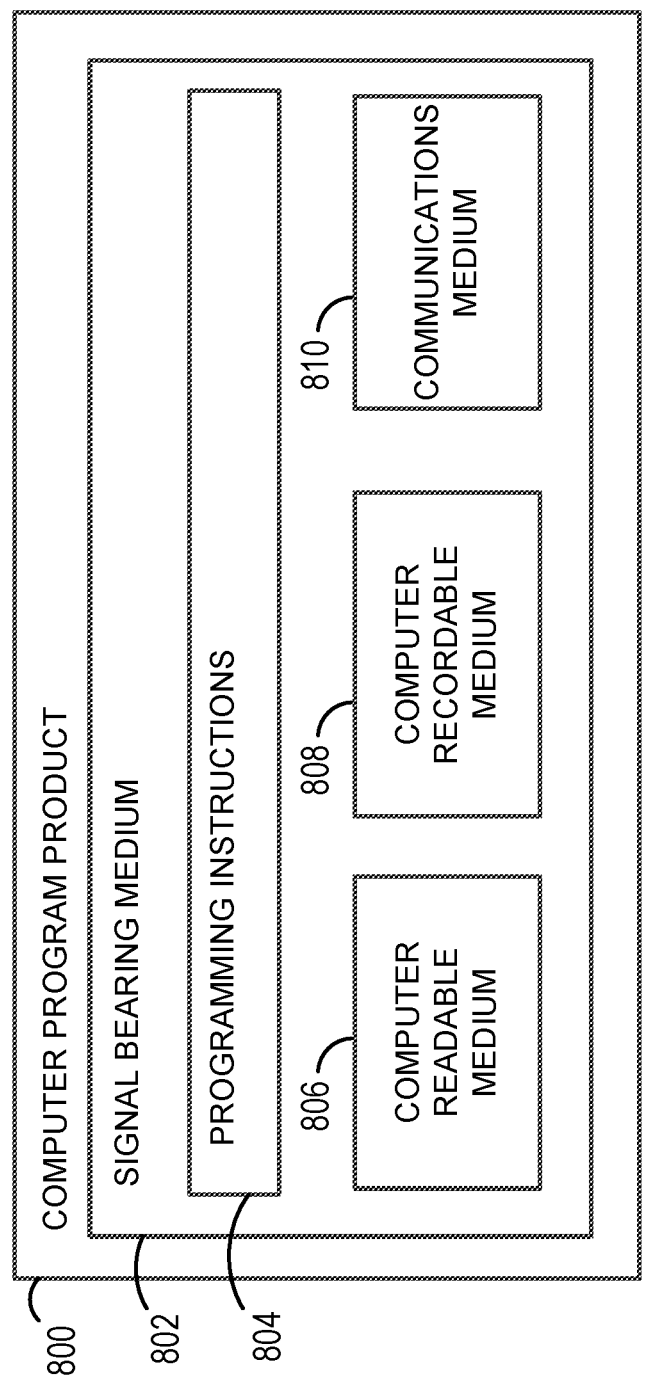
FIG. 8 is a schematic diagram of a computer program, according to example implementations.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

One or more programming instructions 804 may be, for example, computer executable and/or logic implemented instructions. In some examples, a computing device such as the computer system 112 of FIG. 1 may be configured to provide various operations, functions, or actions in response to the programming instructions 804 conveyed to the computer system 112 by one or more of the computer readable medium 806, the computer recordable medium 808, and/or the communications medium 810. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   receiving, at a computing device and from a radar coupled to a vehicle, radio-frequency (RF) signals propagating in an environment of the vehicle;
   determining a distance and an angle to a source of the RF signals, wherein the source of the RF signals is a vehicle radar system used by a second vehicle operating in the environment of the vehicle;
   performing a comparison between a power level of the RF signals and a power level threshold, wherein the power level threshold depends on the distance and the angle to the source of the RF signals;
   based on the comparison indicating the power level of the RF signals is below the power level threshold, decreasing a confidence assigned to the radar coupled to the vehicle; and
   controlling, by the computing device, the vehicle according to a strategy generated based on the decreased confidence assigned to the radar.

2. The method of claim 1, further comprising:
   based on receiving the RF signals, identifying one or more parameters of the RF signals that indicate the RF signals originate from the vehicle radar system used by the second vehicle.

3. The method of claim 2, wherein identifying one or more parameters of the RF signals that indicate the RF signals originate from the vehicle radar system used by the second vehicle comprises:
   performing a comparison between first parameters corresponding to RF signals transmitted by the radar coupled to the vehicle and second parameters corresponding to the RF signals propagating in the environment; and
   based on the comparison between the first parameters and the second parameters, identifying at least one parameter in the second parameters that indicates the RF signals originate from the vehicle radar system used by the second vehicle.

4. The method of claim 1, wherein determining the distance and the angle to the source of the RF signals comprises:
   determining the RF signals originate from the vehicle radar system used by the second vehicle positioned in the environment; and
   estimating a distance and an angle to the second vehicle.

5. The method of claim 4, wherein estimating the distance and the angle to the second vehicle comprises:
   communicating via wireless communication with the second vehicle; and
   estimating the distance and the angle to the second vehicle based on information received during the wireless communication with the second vehicle.

6. The method of claim 4, wherein estimating the distance and the angle to the second vehicle comprises:
   estimating the distance and the angle to the second vehicle based on sensor data from one or more vehicle sensors.

7. The method of claim 1, further comprising:
   communicating with the source of the RF signals; and
   based on communicating with the source of the RF signals, increasing the confidence assigned to the radar.

8. The method of claim 1, further comprising:
   receiving radar data from the radar coupled to the vehicle; and
   based on the radar data, increasing the confidence assigned to the radar.

9. The method of claim 1, further comprising:
   based on determining the distance and the angle to the source of the RF signals, identifying, using an interference model, the power level threshold,
   wherein the interference model represents respective power level thresholds for a plurality of spatial relationships between the vehicle and a given source of the RF signals, and
   wherein each spatial relationship depends on a distance and an angle between the vehicle and the given source of the RF signal.

10. The method of claim 1, further comprising:
    based on the comparison, triggering a cleaning process for the radar.

11. The method of claim 10, further comprising:
    evaluating subsequent performance by the radar based on triggering the cleaning process for the radar; and
    adjusting the confidence assigned to the radar based on evaluating subsequent performance by the radar.

12. The method of claim 1, wherein decreasing the confidence assigned to the radar comprises:
    disregarding radar data obtained via the radar during subsequent navigation of the vehicle.

13. The method of claim 1, wherein decreasing the confidence assigned to the radar coupled to the vehicle comprises:
   determining fouling is present on a radome of the radar.

14. The method of claim 1, wherein controlling the vehicle based on the decreased confidence assigned to the radar comprises:
   controlling the vehicle based on sensor data from one or more vehicle sensors, wherein the one or more vehicle sensors differ from the radar.

15. The method of claim 1, wherein controlling the vehicle according to the strategy generated based on the decreased confidence assigned to the radar comprises:
   selecting a set of vehicle sensors coupled to the vehicle based on the decreased confidence assigned to the radar, wherein the set of vehicle sensors differ from the radar; and
   controlling the vehicle using sensor data from the set of vehicle sensors.

16. A system comprising:
   a first vehicle radar system coupled to a vehicle;
   a computing device coupled to the vehicle and configured to:
      receive, from a radar of the first vehicle radar system, radio-frequency (RF) signals propagating in an environment of the vehicle;
      determine a distance and an angle to a source of the RF signals, wherein the source is a second vehicle radar system used by a second vehicle operating in the environment of the vehicle;
      perform a comparison between a power level of the RF signals and a power level threshold, wherein the power level threshold depends on the distance and the angle to the source of the RF signals;
      based on the comparison indicating the power level of the RF signals is below the power level threshold, decrease a confidence assigned to the radar coupled to the vehicle; and
      control the vehicle according to a strategy generated based on the decreased confidence assigned to the radar.

17. The system of claim 16, wherein the vehicle is a first vehicle, and wherein the second vehicle is configured to wirelessly communicate transmission parameters and location information to the first vehicle.

18. The system of claim 17, wherein the computing device is further configured to:
   determine the distance and the angle to the second vehicle based on the location information.

19. The system of claim 18, wherein the computing device is further configured to
   perform the comparison between the power level of the RF signals and the power level threshold, wherein the power level threshold is further based on the transmission parameters.

20. A non-transitory computer-readable medium configured to store instructions, that when executed by a computing system comprising one or more processors, causes the computing system to perform operations comprising:
   receiving, from a radar coupled to a vehicle, radio-frequency (RF) signals propagating in an environment of the vehicle;
   determining a distance and an angle to a source of the RF signals, wherein the source of the RF signals is a vehicle radar system used by a second vehicle operating in the environment of the vehicle;
   performing a comparison between a power level of the RF signals and a power level threshold, wherein the power level threshold depends on the distance and the angle to the source of the RF signals;
   based on the comparison indicating the power level of the RF signals is below the power level threshold, decreasing a confidence assigned to the radar coupled to the vehicle; and
   controlling the vehicle according to a strategy generated based on the decreased confidence assigned to the radar.

\* \* \* \* \*